(No Model.)

J. A. HOUSE.
COMBINED BELT PUNCH, BELT CUTTER, AND PLIERS.

No. 525,460. Patented Sept. 4, 1894.

WITNESSES
O. B. Collins
Charles S. Brintnall

INVENTOR
James A. House
by W. E. Hagan atty

UNITED STATES PATENT OFFICE.

JAMES A. HOUSE, OF BRIDGEPORT, CONNECTICUT, ASSIGNOR TO LINTNER & SPORBORG, OF GLOVERSVILLE, NEW YORK.

COMBINED BELT-PUNCH, BELT-CUTTER, AND PLIERS.

SPECIFICATION forming part of Letters Patent No. 525,460, dated September 4, 1894.

Application filed May 3, 1894. Serial No. 509,913. (No model.)

*To all whom it may concern:*

Be it known that I, JAMES A. HOUSE, of Bridgeport, Fairfield county, State of Connecticut, have invented a new and useful Combined Belt-Punch, Belt-Cutter, and Pliers, of which the following is a specification.

My invention relates to a combination tool in which a round-belt cutter, and punch are combined with plier-jaws by which the tool is particularly adapted to be used in connection with sewing machines, and other apparatus in which round or cord-belts are used and which as they become stretched from use, have to be disconnected at their ends, a piece cut off, and then punched for reconnection.

Figure 3:
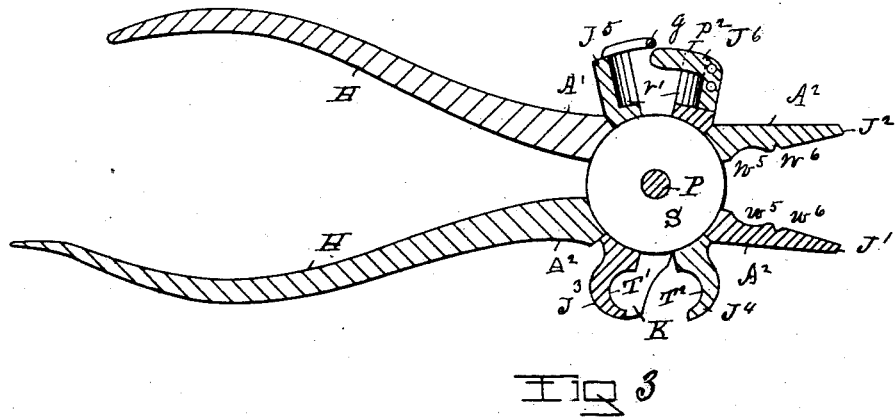
Figure 1:
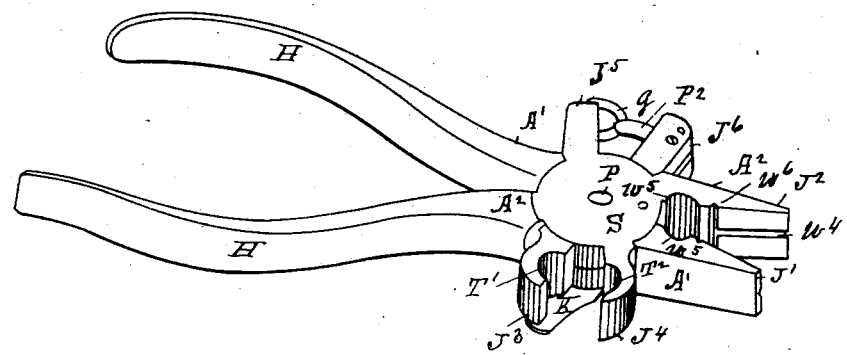
Figure 2:
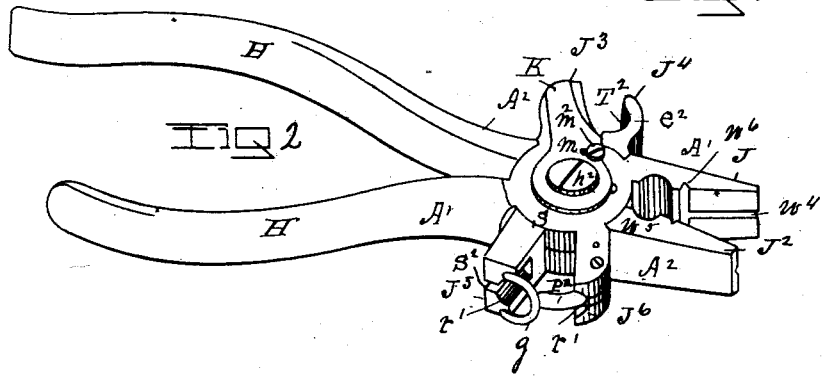

Accompanying this specification to form a part of it there is a plate of drawings containing three figures illustrating my invention with the same designation of parts by letter reference used in all of them. Of these illustrations Figure 1, illustrates a perspective of my improved combination tool, and Fig. 2 another perspective of it, with the side facing the view which is opposite to that shown at Fig. 1. Fig. 3, is a central longitudinal section taken from end to end.

The several parts of the implement thus illustrated are designated by letter reference and the function of the parts is described as follows.

The letter $A'$, designates one of the two implement parts, and $A^2$, the other, both of which are made alike as to their pivotal connection and opening and closing action.

The letters $J'$, and $J^2$, designate the plier jaws, $J^3$, and $J^4$, the belt-grasping and cutting jaws; and $J^5$, and $J^6$, the punching jaws one of each of the before named parts, together with a socket-part S, and a handle H, being formed integrally as one casting, and these two parts are connected by a tongs pivot P. These jaw-parts are arranged at right angles to each other, the plier jaws being arranged at the outer ends, the cutting and the punching jaws being arranged upon opposite sides and at right angles to the plier jaws, and as thus constructed are operated simultaneously. The jaw-parts $J'$, and $J^2$, form the plier-part of the implement and they are each made to have on their interior, the cross-recesses $w^5$, and $w^6$, and the longitudinal recess $w^4$, they being thus made to adapt them to grasp round or flat surfaces. The jaw-parts $J^3$, and $J^4$, which perform grasping and cutting functions are each formed by an offset from the socket-part S, and they are each constructed with a concave recess, which is formed on the inner face of the jaw-parts; that formed in the jaw-part $J^3$, being indicated at $T'$, and that formed in the jaw-part $J^4$, designated at $T^2$, and these latter concave recesses in each of these jaw-parts $J^3$ and $J^4$ are formed so as to be in line with the pivot P, on which they open and close, and which when closed form a tube-form interior by which a round belt end may be grasped and held for cutting.

The letter K, designates a knife-blade which at its inner end is mounted upon the pivot P, where the latter extends beyond the implement and between the latter and the pivot head $h^2$, and therefrom this blade is extended along the adjacent side-face of the jaw-part $J^3$, to move with the latter and to make a shear or cutting engagement with the edge $e^2$, of the jaw-part $J^4$, so that a round-belt may be grasped by the concavities of the jaw-parts $J^3$, and $J^4$, and the belt cut off by the action of the blade K, when said parts are operated by the handle-parts. This knife K, is made with a slot $m$, and is provided with a set-screw $m^2$, arranged therein by which the knife is made adjustable, as to the measure of its shear engagement.

The letters $J^5$, and $J^6$, designate the punching jaws each of which are made with a recess $r'$, on their inner faces, and these recesses have their concavity made transversely in the jaw-parts so that the end of a round belt may be passed therein, and grasped by the interiorly arranged recesses which when the said jaws are closed give to them a tube-form interior.

The letter $g$, designates a U-form loop which is projected from the outer face of the jaw-part $J^5$, to be parallel to its outside end-face and so as to have the rounded interior face of said loop in line with the concavity of the recess $r'$ formed in the jaw-part $J^6$ when the latter and the jaw-part $J^5$, are together. The function of this loop $g$, is to receive and hold the round end of the belt before the jaws are closed when being inserted between the latter to be punched.

The letter S², designates a slot formed in the jaw-part J⁵, for the passage of the punch P², and the latter is attached to the jaw part J⁶, and is arranged to project inwardly from the concave recess produced in said jaw-part and so that when a belt-end is inserted through the loop g, and so as to be between the jaw-parts J⁵, and J⁶, and the latter are forced together by the handles the punch will pass through the belt inside of its end and also pass through the slot S². As thus made and arranged to be operated a very useful combination tool is produced and which by its construction is well adapted for the uses designed.

Having thus described my invention, what I claim, and desire to secure by Letters Patent, is—

The combination tool herein described formed by the pivotally connected plier-jaws J', and J², projected from its outer end; the cutting jaws J³, and J⁴, projected from one of its sides at right-angles to the plier-jaws, and each of said cutting-jaws being provided with a concave belt receiving interior, and one of them having a blade making a shear engagement with the adjacent edge of the other and the punching-jaws J⁵, and J⁶, arranged at right-angles to the plier-jaws, and each made with a laterally arranged concavity on its inner face, and one of them being provided with a U-form loop, and a slot, and the other made with a punch projecting inwardly from its concavity; and provided with handles H, H, constructed and arranged to operate substantially as shown and described.

Signed at Bridgeport, Connecticut, this 19th day of April, 1894, in the presence of the two witnesses whose names are hereto annexed.

JAMES A. HOUSE.

Witnesses:
JAMES CARR,
S. S. DIMOND.